(12) United States Patent
Roberge

(10) Patent No.: US 10,145,302 B2
(45) Date of Patent: Dec. 4, 2018

(54) GAS TURBINE ENGINE LUBRICATION SYSTEM

(71) Applicant: UNITED TECHNOLOGIES CORPORATION, Hartford, CT (US)

(72) Inventor: Gary D. Roberge, Tolland, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 596 days.

(21) Appl. No.: 14/768,232

(22) PCT Filed: Feb. 26, 2014

(86) PCT No.: PCT/US2014/018577
§ 371 (c)(1),
(2) Date: Aug. 17, 2015

(87) PCT Pub. No.: WO2014/137692
PCT Pub. Date: Sep. 12, 2014

(65) Prior Publication Data
US 2015/0361888 A1  Dec. 17, 2015

Related U.S. Application Data

(60) Provisional application No. 61/772,163, filed on Mar. 4, 2013.

(51) Int. Cl.
*F02C 7/06* (2006.01)
*F01D 25/18* (2006.01)
*F02K 3/06* (2006.01)
*F02C 3/107* (2006.01)
*F02C 7/36* (2006.01)

(52) U.S. Cl.
CPC ............... *F02C 7/06* (2013.01); *F01D 25/18* (2013.01); *F02C 3/107* (2013.01); *F02C 7/36* (2013.01); *F02K 3/06* (2013.01); *F05D 2260/40311* (2013.01); *F05D 2260/98* (2013.01)

(58) Field of Classification Search
CPC .... F02C 7/06; F02C 7/36; F02C 3/107; F01D 25/18; F02K 3/06; F05D 2260/40311; F05D 2260/98
USPC .............................................. 415/1, 110, 111
See application file for complete search history.

(56) References Cited

U.S. PATENT DOCUMENTS

| 7,426,834 B2 | 9/2008 | Granitz et al. |
| 7,640,723 B2 | 1/2010 | Alexander |
| 7,886,875 B2 | 2/2011 | Shevchencko et al. |
| 8,261,527 B1 | 9/2012 | Stearns et al. |

(Continued)

OTHER PUBLICATIONS

Extended European Search Report for European Application No. 14759478.2 dated Oct. 11, 2016.

(Continued)

*Primary Examiner* — Mark Laurenzi
*Assistant Examiner* — Mickey France
(74) *Attorney, Agent, or Firm* — Carlson, Gaskey & Olds, P.C.

(57) ABSTRACT

A gas turbine engine according to an exemplary aspect of the present disclosure includes, a shaft including at least one bearing, a speed change device in communication with the shaft, a first lubrication system in communication with the at least one bearing and a second lubrication system in communication with the speed change device.

18 Claims, 4 Drawing Sheets

(56) References Cited

U.S. PATENT DOCUMENTS

| | | |
|---|---|---|
| 2009/0014245 A1 | 1/2009 | Shevchenko et al. |
| 2009/0191060 A1 | 7/2009 | Bagepalli et al. |
| 2009/1091060 | 7/2009 | Bagepalli et al. |
| 2010/0086403 A1* | 4/2010 | McCune ............... F01D 25/20 |
| | | 415/229 |
| 2011/0047959 A1* | 3/2011 | DiBenedetto .......... F02C 7/052 |
| | | 60/39.092 |
| 2012/0192570 A1 | 8/2012 | McCune et al. |
| 2015/0369082 A1 | 12/2015 | Schwarz et al. |

OTHER PUBLICATIONS

International Preliminary Report on Patentability for PCT/US2014/018577 dated Sep. 17, 2015.

International Search Report and Written Opinion for PCT Application No. PCT/US2014/018577, dated May 27, 2014.

* cited by examiner

GAS TURBINE ENGINE LUBRICATION SYSTEM

BACKGROUND

This application relates to a lubrication system for use in a gas turbine engine.

A gas turbine engine typically includes a fan section, a compressor section, a combustor section, and a turbine section. Air entering the compressor section is compressed and delivered into the combustor section where it is mixed with fuel and ignited to generate a high-energy exhaust gas flow. The high-energy exhaust gas flow expands through the turbine section providing the necessary work to drive the compressor section and the fan section.

The fan section, the compressor section, and the turbine section are supported by bearing assemblies. The fan section is connected to the turbine section through the use of a gear reduction device. This allows the fan to rotate at slower speeds than the turbine section.

SUMMARY

A gas turbine engine according to an exemplary aspect of the present disclosure includes, a shaft including at least one bearing, a speed change device in communication with the shaft, a first lubrication system in communication with the at least one bearing and a second lubrication system in communication with the speed change device.

In a further non-limiting embodiment of the foregoing gas turbine engine, the first lubrication system includes a first fluid condition sensor configured to monitor fluid entering the at least one bearing.

In a further non-limiting embodiment of either of the foregoing gas turbine engines, the first lubrication system includes a pump and at least one heat exchanger.

In a further non-limiting embodiment of any of the foregoing gas turbine engines, the first lubrication system includes a second fluid condition sensor located downstream of the at least one bearing configured to monitor fluid exiting the at least one bearing.

In a further non-limiting embodiment of any of the foregoing gas turbine engines, the first fluid condition sensor and the second fluid condition sensor are configured to monitor at least one of flow rate, pressure, temperature, lubricant condition, and metal or other contaminant content.

In a further non-limiting embodiment of any of the foregoing gas turbine engines, the second lubrication system includes a first fluid condition sensor configured to monitor fluid entering the speed change device.

In a further non-limiting embodiment of any of the foregoing gas turbine engines, the second lubrication system includes a pump and at least one heat exchanger.

In a further non-limiting embodiment of any of the foregoing gas turbine engines, the second lubrication system includes a second fluid condition sensor located downstream of the speed change device configured to monitor fluid exiting the speed change device.

In a further non-limiting embodiment of any of the foregoing gas turbine engines, the first fluid condition sensor and the second fluid condition sensor are configured to monitor at least one of flow rate, pressure, temperature, lubricant condition, and metal or other contaminant content.

In a further non-limiting embodiment of any of the foregoing gas turbine engines, the second lubrication system is in fluid communication with at least one shaft bearing.

In a further non-limiting embodiment of any of the foregoing gas turbine engines, the first lubrication system is in fluid communication with at least one accessory drive.

In a further non-limiting embodiment of any of the foregoing gas turbine engines, the first lubrication system is in fluid communication with at least one gearbox.

In a further non-limiting embodiment of any of the foregoing gas turbine engines, the speed change device is an epicyclic gear train.

In a further non-limiting embodiment of any of the foregoing gas turbine engines, a third lubrication system is in communication with a second speed change device.

A method of lubricating a gas turbine engine according to another exemplary aspect of the present disclosure includes, among other things, directing a first lubricant to at least one bearing with a first lubrication system and directing a second lubricant to a speed change device with a second lubrication system.

In a further non-limiting embodiment of the foregoing method, the method includes monitoring a condition of the second lubricant in the second lubrication system before the second lubricant enters the speed change device.

In a further non-limiting embodiment of either of the foregoing methods, the method includes monitoring a condition of the first lubricant in the first lubrication system before the first lubricant enters the at least one bearing.

In a further non-limiting embodiment of any of the foregoing methods, the at least one bearing is a shaft bearing.

In a further non-limiting embodiment of any of the foregoing methods, the first lubrication system directs the first lubricant at a first flow rate and the second lubrication system directs the second lubricant at a second flow rate, the first flow rate being greater than the second flow rate.

In a further non-limiting embodiment of any of the foregoing methods, the first lubrication system maintains an operating condition at a first predetermined value and the second lubrication maintains the operating characteristic at a second predetermined value different from the first predetermined value.

The various features and advantages of this disclosure will become apparent to those skilled in the art from the following detailed description. The drawings that accompany the detailed description can be briefly described as follows.

DETAILED DESCRIPTION

Figure 1:
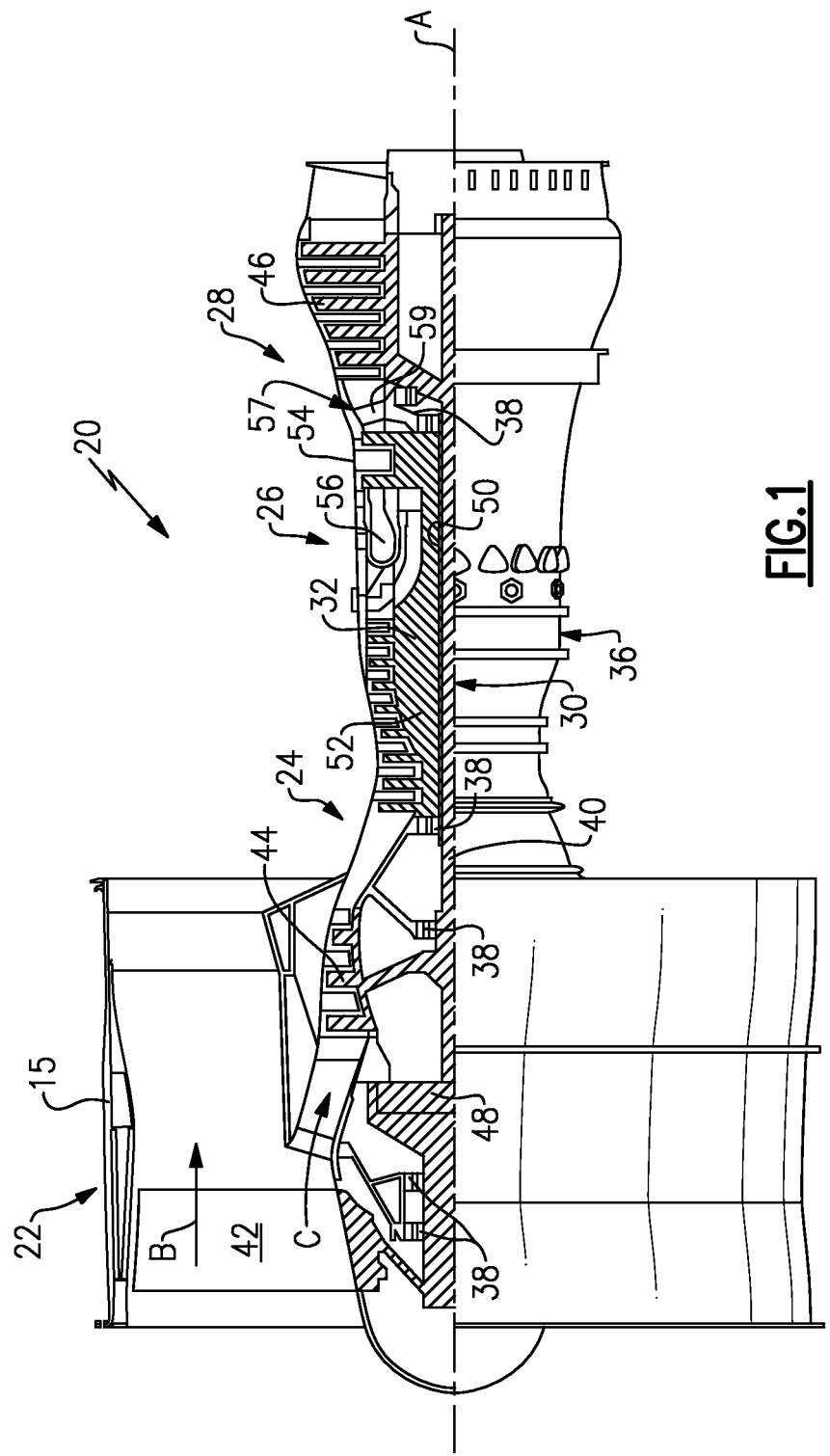
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a fan case or fan duct 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports one or more bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, the geared architecture 48 and bearing systems 38 may be varied. For example, gear system 50 may be located aft of combustor section 26 or even aft of turbine section 28, and fan section 22 may be positioned forward or aft of the location of geared architecture 48. In another example, the gas turbine engine 20 may include multiple fan sections or compressor sections 24 driven by one or more geared architectures 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }° R)/(518.7° R)]^{0.5}$. The "Low corrected fan tip speed" as disclosed herein according to one non-limiting embodiment is less than about 1150 ft/second.

Figure 2:
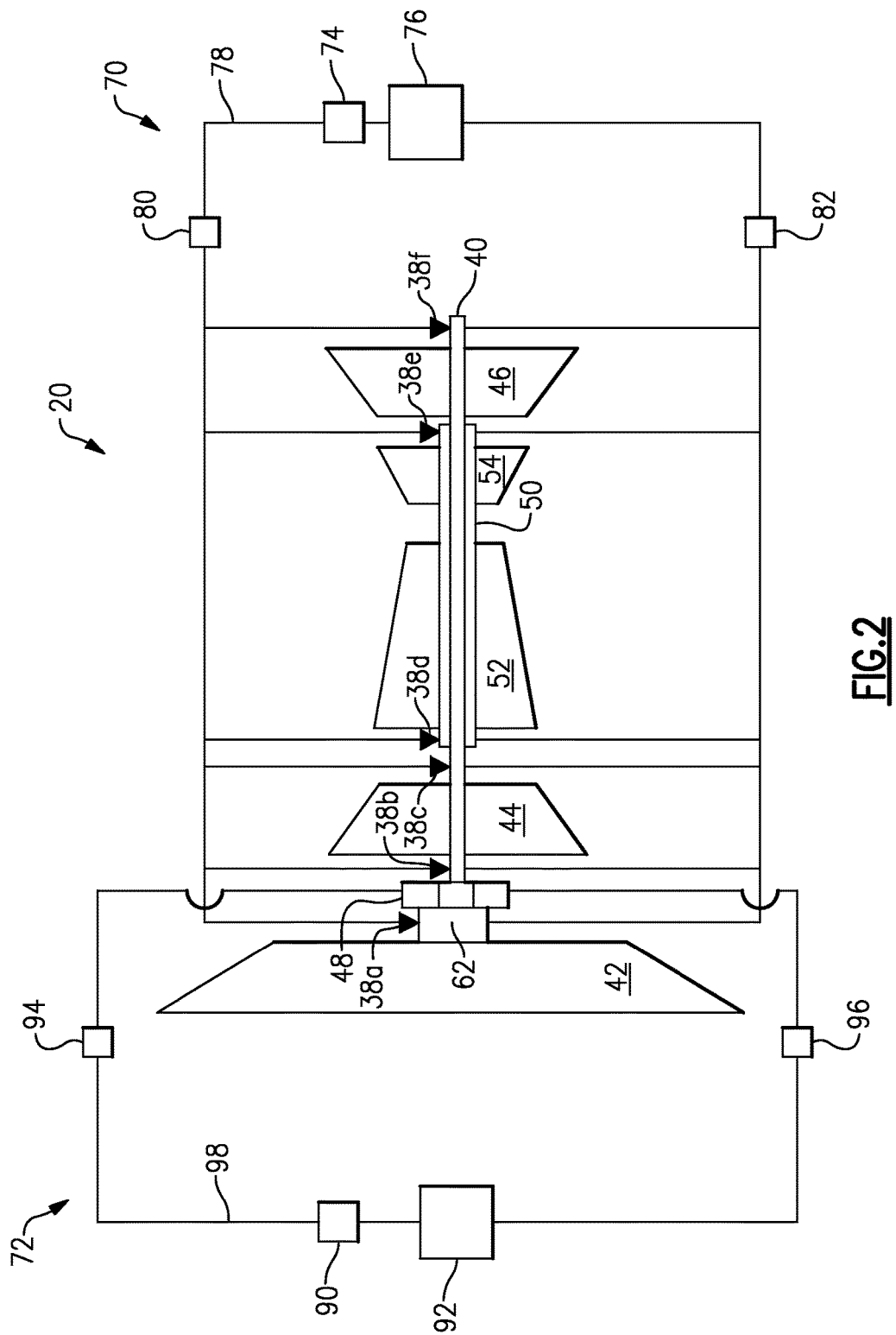
FIG. 2 is a schematic view of an example lubrication system.

FIG. 2 illustrates a schematic view of the engine 20, a first lubrication system 70, and a second lubrication system 72. The first lubrication system 70 includes a pump 74 in fluid communication with first through sixth bearing systems 38a, 38b, 38c, 38d, 38e, and 38f (collectively hereinafter 38a-38f), sequentially disposed forward through aft, through a lubricant conduit 78. A fluid condition sensor 80 is located downstream of the pump 74 and upstream of the bearing systems 38a-38f. The fluid condition sensor 80 monitors a condition of the lubricant received from the pump 74, such as flow rate, lubrication system pressure, lubrication system temperature, lubrication fluid condition or degradation, and/or metal or other contaminant content.

After passing through the fluid condition sensor 80, the lubricant is directed to the bearing system 38a on a disk hub 62 of the fan section 22, bearing systems 38b, 38c, and 38f on the inner shaft 40, and bearing systems 38d and 38e located on the outer shaft 50 through the lubricant conduit 78. This configuration maintains adequate lubrication, cooling, and cleaning of the constituent components.

Although a specific number and location of bearing systems 38 are shown in the illustrated embodiment, additional bearing systems 38 could be located along the inner shaft 40, the outer shaft 50, or the disk hub 62. Additionally, the bearing systems 38a-38f could be located at different locations along the inner shaft 40, the outer shaft 50, or the disk hub 62.

A fluid condition sensor 82 is located downstream of the bearing systems 38a-38f. The fluid condition sensor 80 monitors flow rate, lubrication system pressure, lubrication system temperature, lubrication fluid condition or degradation, and/or metal or other contaminant content of the lubricant to detect possible wear or damage to the bearing systems 38a-38f. Alternatively, fluid condition sensors 80 and 82 may be used individually or in combination. A heat exchanger 76 or other device intended to remove heat from the first lubrication system 70 is located downstream from the bearing systems 38a-38f and upstream from the pump 74 to cool the lubricant before recirculating the lubricant through the first lubrication system 70. Alternatively, the heat exchanger 76 may be located downstream of the pump 74 or used in combination with the pump 74.

The second lubrication system 72 includes a pump 90 in fluid communication with the geared architecture 48 through a lubricant conduit 98. A fluid condition sensor 94 is located downstream of the pump 90 and upstream of the geared architecture 48. The fluid condition sensor 94 monitors a condition of the lubricant exiting the pump 90 such as flow rate, lubrication system pressure, lubrication system temperature, lubrication fluid condition or degradation, and/or metal or other contaminant content.

After passing through the fluid condition sensor 94, lubricant is directed to the geared architecture 48 through the lubricant conduit 98 to maintain adequate lubrication, cooling, and cleaning of the geared architecture 48. A fluid condition sensor 96 is located downstream of the geared architecture 48 to monitor flow rate, lubrication system pressure, lubrication system temperature, lubrication fluid condition or degradation, and/or metal or other contaminant content of the lubricant to detect possible wear or damage to the geared architecture 48. Alternatively, fluid condition sensors 94 and 96 may be used individually or in combination. A heat exchanger 92 is located downstream of geared architecture 48 and upstream of the pump 90 to cool the lubricant before recirculating the lubricant through the second lubrication system 72. Alternatively, the heat exchanger 92 may be located downstream of the pump 90 or used in combination with the pump 90.

In this example, the first lubrication system 70 directs lubricant through the lubricant conduit 78 with different lubrication operating characteristics than the second lubrication system 72 directs lubricant through the lubricant conduit 98. For example, lubricant flow rate, temperature, pressure, degradation limit, contaminant limit or other operating characteristic may vary.

The first lubrication system 70 and the second lubrication system 72 are fluidly isolated from each other and thus can be independently controlled to control lubrication, cooling, and cleaning of the bearing systems 38 and the geared architecture 48. This configuration enables potentially identifying issues isolated at the geared architecture 48 or the bearing systems 38. Additionally, isolating the first lubrication system 70 from the second lubrication system 72 allows each system to utilize a specific type and/or operating characteristic of lubricant that is designed to meet the specific lubricating demands of each system.

Figure 3:
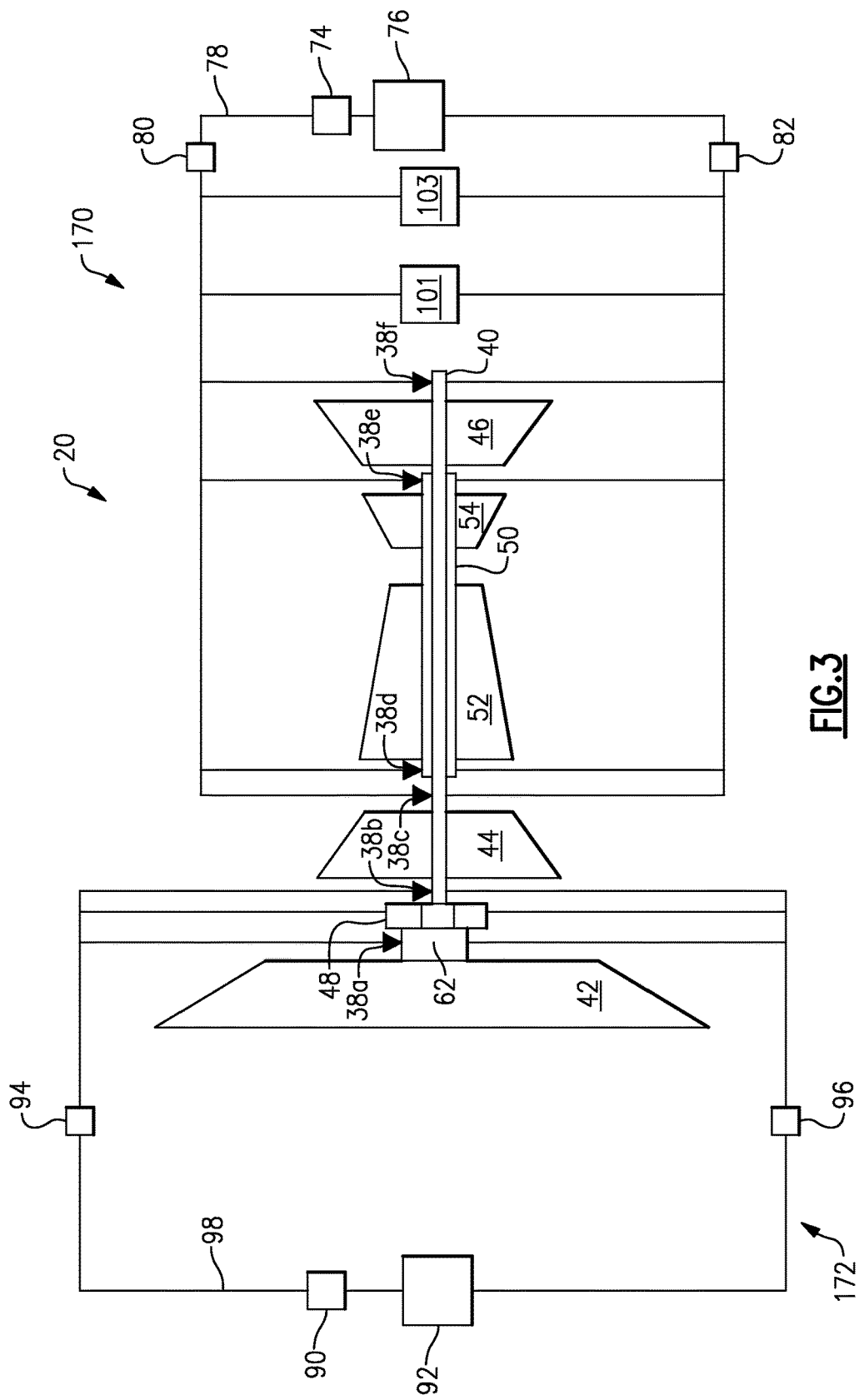
FIG. 3 is a schematic view of another example lubrication system.

FIG. 3 illustrates a schematic view of the engine 20 with another example first lubrication system 170 and second lubrication system 172 similar to the embodiment shown in FIG. 2. To facilitate the discussion, the differences between the embodiments in the two figures will be addressed while the similarities will be omitted.

The first lubrication system 170 includes the pump 74 in fluid communication with the bearing systems 38*c*, 38*d*, 38*e*, and 38*f* (collectively hereinafter 38*c*-38*f*), a gearbox 101, and an accessory drive 103 through the lubricant conduit 78. Although a single gearbox 101 and accessory drive 103 are illustrated, additional gearboxes and accessory drives could be included in the lubrication system 170.

After lubricant passes through the fluid condition sensor 80, the lubricant is directed to the bearing systems 38*c*-38*f*, the gearbox 101, and the accessory drive 103 through the lubricant conduit 78 to maintain adequate lubrication, cooling, and cleaning of the constituent components. The fluid condition sensor 82 is located downstream of the bearing systems 38*c*-38*f*, the gearbox 101, and the accessory drive 103, and upstream of the heat exchanger 76.

The second lubrication system 172 includes the pump 90 in fluid communication with the geared architecture 48 and one or more of the bearing systems 38*a* and 38*b* through the lubricant conduit 98. By connecting the bearing systems 38*a* and 38*b* with the adjacent geared architecture 48 to the lubricant conduit 98, the routing of the lubricant conduit 78 of the first lubrication system 170 is simplified.

After lubricant passes through the fluid condition sensor 94, the lubricant is directed to the geared architecture 48 and one or more of the bearing systems 38*a* and 38*b* through the lubricant conduit 98 to maintain adequate lubrication, cooling, and cleaning of the constituent components. The fluid condition sensor 96 is located downstream of the geared architecture 48 and the bearing systems 38*a* and 38*b* and upstream of the heat exchanger 92.

Figure 4:
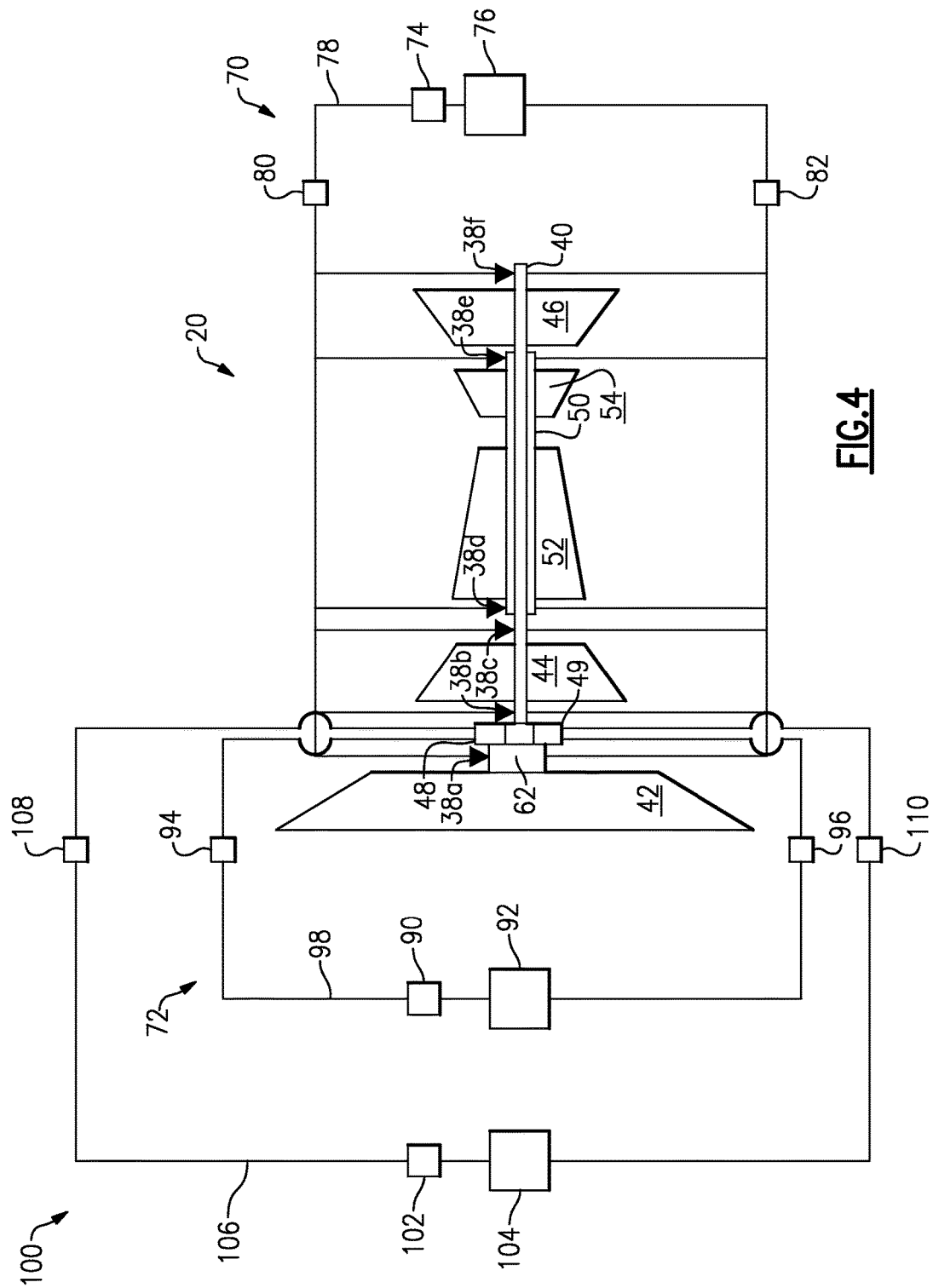
FIG. 4 is a schematic view of yet another example lubrication system.

FIG. 4 illustrates a schematic view of the engine 20 with a third lubrication system 100 in addition to the first lubrication system 70 and the second lubrication system 72 as shown in FIG. 2. To further the discussion, the differences between the embodiments in the two figures will be addressed while the similarities will be omitted.

The third lubrication system 100 includes a pump 102 in fluid communication with a second geared architecture 49 through a lubricant conduit 106. The third lubrication system 100 operates independently of the first lubrication system 70 and the second lubrication system 72. The second geared architecture 49 is located adjacent and in mechanical communication with the geared architecture 48. A fluid condition sensor 108 is located downstream of the pump 102 and upstream of the second geared architecture 49. The fluid condition sensor 108 monitors a condition of the lubricant exiting the pump 102 such as flow rate, lubrication system pressure, lubrication system temperature, lubrication fluid condition or degradation, and/or metal or other contaminant content.

After passing through the fluid condition sensor 108, lubricant is directed to the second geared architecture 49 through the lubricant conduit 106 to maintain adequate lubrication, cooling, and cleaning of the second geared architecture 49. A fluid condition sensor 110 is located downstream of the second geared architecture 49 to monitor flow rate, lubrication system pressure, lubrication system temperature, lubrication fluid condition or degradation, and/or metal or other contaminant content of the lubricant to detect possible wear or damage to the second geared architecture 49. Alternatively, fluid condition sensors 108 and 110 may be used individually or in combination.

A heat exchanger 104 is located downstream of the second geared architecture 49 and upstream of the pump 102 to cool the lubricant before recirculating the lubricant through the third lubrication system 100. Alternatively, the heat exchanger 104 may be located downstream of the pump 102 or used in combination with the pump 102.

Although the illustrated example includes the first lubrication system 70, the second lubrication system 72, and the third lubrication system 100, additional lubrication systems may be included to direct lubricant to any one of the bearings systems 38*a*-38*f*, the geared architecture 48, the second geared architecture 49, the gearbox 101, or the accessory drive 103.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A gas turbine engine comprising:
a shaft including at least one bearing;
a speed change device in communication with the shaft;
a first lubrication system in communication with the at least one bearing;
a second lubrication system in communication with the speed change device, wherein the first lubrication system is fluidly isolated from the second lubrication system; and
a third lubrication system in communication with a second speed change device and the third lubrication system is fluidly isolated from the first lubrication system and the second lubrication system.

2. The gas turbine engine of claim 1, wherein the first lubrication system includes a first fluid condition sensor configured to monitor fluid entering the at least one bearing.

3. The gas turbine engine of claim 2, wherein the first lubrication system includes a pump and at least one heat exchanger.

4. The gas turbine engine of claim 2, wherein the first lubrication system includes a second fluid condition sensor located downstream of the at least one bearing configured to monitor fluid exiting the at least one bearing.

5. The gas turbine engine of claim 4, wherein the first fluid condition sensor and the second fluid condition sensor are configured to monitor at least one of flow rate, pressure, temperature, lubricant condition, and metal or other contaminant content.

6. The gas turbine engine of claim 1, wherein the second lubrication system includes a first fluid condition sensor configured to monitor fluid entering the speed change device.

7. The gas turbine engine of claim 6, wherein the second lubrication system includes a pump and at least one heat exchanger.

8. The gas turbine engine of claim 6, wherein the second lubrication system includes a second fluid condition sensor located downstream of the speed change device configured to monitor fluid exiting the speed change device.

9. The gas turbine engine of claim 8, wherein the first fluid condition sensor and the second fluid condition sensor are configured to monitor at least one of flow rate, pressure, temperature, lubricant condition, and metal or other contaminant content.

10. The gas turbine engine of claim 1, wherein the second lubrication system is in fluid communication with at least one shaft bearing.

11. The gas turbine engine of claim 1, wherein the first lubrication system is in fluid communication with at least one accessory drive.

12. The gas turbine engine of claim 1, wherein the first lubrication system is in fluid communication with at least one gearbox.

13. The gas turbine engine of claim 1, wherein the speed change device is an epicyclic gear train.

14. A method of lubricating a gas turbine engine comprising the steps of:
directing a first lubricant to at least one bearing with a first lubrication system; and
directing a second lubricant to a speed change device with a second lubrication system, wherein the at least one bearing includes a plurality of shaft bearings, the first lubrication system is fluidly isolated from the second lubrication system, and the first lubricant is a different lubricant from the second lubricant.

15. The method of claim 14, including monitoring a condition of the second lubricant in the second lubrication system before the second lubricant enters the speed change device.

16. The method of claim 14, including monitoring a condition of the first lubricant in the first lubrication system before the first lubricant enters the at least one bearing.

17. The method of claim 14, wherein the first lubrication system directs the first lubricant at a first flow rate and the second lubrication system directs the second lubricant at a second flow rate, the first flow rate being greater than the second flow rate.

18. The method of claim 14, wherein the first lubrication system maintains an operating condition at a first predetermined value and the second lubrication maintains the operating characteristic at a second predetermined value different from the first predetermined value.

* * * * *